No. 716,754.  
M. PIVERT.  
FRICTION CLUTCH.  
(Application filed June 5, 1902.)
Patented Dec. 23, 1902.
(No Model.)
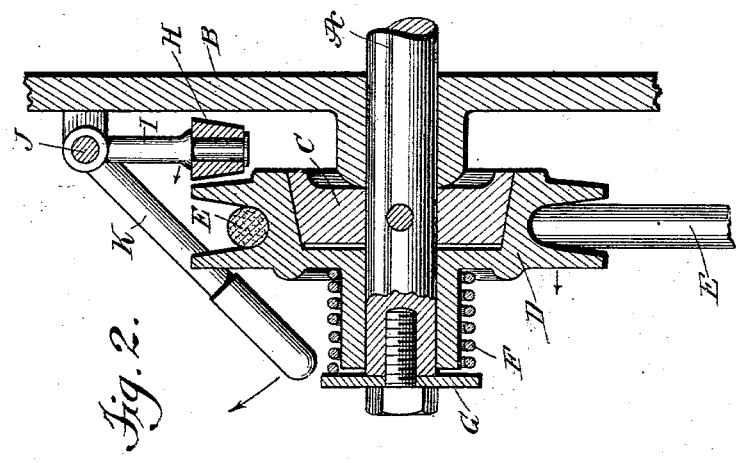
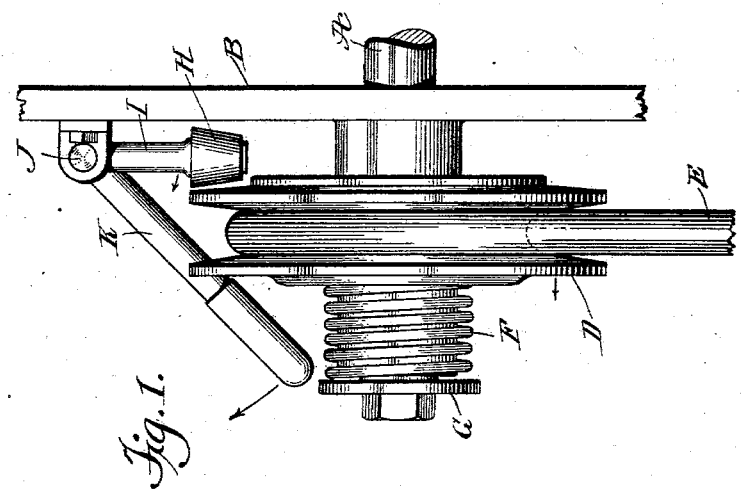
WITNESSES:
INVENTOR  
Maurice Pivert  
BY  
ATTORNEYS.

UNITED STATES PATENT OFFICE.

MAURICE PIVERT, OF NEW ORLEANS, LOUISIANA.

FRICTION-CLUTCH.

SPECIFICATION forming part of Letters Patent No. 716,754, dated December 23, 1902.

Application filed June 5, 1902. Serial No. 110,311. (No model.)

*To all whom it may concern:*

Be it known that I, MAURICE PIVERT, a citizen of the United States, and a resident of New Orleans, in the parish of Orleans and State of Louisiana, have invented a new and Improved Friction-Clutch, of which the following is a full, clear, and exact description.

The invention relates to transmission of power from a motor to a driven part; and the object is to provide a new and improved friction-clutch which is simple and durable in construction, very effective in operation, and arranged to permit the operator to readily disconnect the driven clutch member from the driving clutch member.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in both views.

Figure 1 is a side elevation of the improvement, and Fig. 2 is a sectional side elevation of the same.

The main shaft A of an explosion-engine or other motor is journaled in the usual manner in the frame or casing B of the engine, and on one outer end of this shaft is secured a clutch member C in the shape of a wheel having a beveled peripheral face adapted to be engaged by the correspondingly-shaped inner side of a wheel D, mounted to turn loosely and to slide longitudinally on the outer end of the shaft A. The wheel D is made in the form of a pulley, connected by a belt E with other machinery to be driven, or the said wheel may be made in the form of a gear-wheel in mesh with a gear-wheel attached to the machine to be driven. The wheel D is pressed on its outer face by a spring F, coiled on the hub of the wheel D and abutting with its outer end on a washer G, secured to the extreme outer end of the shaft A. Thus the spring F serves to hold the wheel D in frictional contact with the beveled peripheral face of the clutch member C. Now in order to move the wheel D out of frictional engagement with the clutch member C against the tension of its spring F, I provide a friction-roller H, adapted to engage the inner face or side of the wheel D, the said friction-roller being journaled on the free end of an arm I, secured on a shaft J, journaled in suitable bearings carried by the casing B. On the shaft J is a handle K under the control of the operator to impart a turning motion to the shaft J to swing the arm I outwardly, so that the friction-roller H is moved in engagement with the inner face of the wheel D to slide the latter outwardly on the shaft A against the tension of its spring F and out of frictional contact with the clutch member C. When this takes place, the wheel D will come to a standstill, and as soon as the operator releases the handle K the spring F returns the wheel D to its former position—that is, moves it back into frictional contact with the clutch member C—so that the latter can drive the wheel D and the parts connected therewith.

Having thus described my invention, I claim as new and desire to secure by Letters Patent—

1. A friction-clutch comprising two clutch members, of which one is driven and the other driving, the clutch members having beveled faces for engagement one by the other, a spring for holding the inner clutch member in frictional contact with the other clutch member, and a swinging arm under the control of the operator for moving the spring-pressed clutch member against the tension of its spring and out of frictional contact with the other member, said arm being mounted above the wheel and held out of contact therewith by gravity, as set forth.

2. A friction-clutch, comprising a revoluble shaft, a clutch member rigidly secured on the shaft and having a beveled peripheral face, a transmission-wheel mounted to rotate loosely on the shaft and to slide thereon, said wheel having the inner face of its rim beveled for engaging the peripheral face of the said clutch member, a spring on the hub of the wheel for forcing the wheel into frictional contact with the clutch member, an arm pivotally mounted adjacent to the wheel and adapted to be swung into contact with one side face of the wheel to slide it out of contact with the clutch member and a handle connected with said arm, as set forth.

3. A friction-clutch comprising a revoluble shaft, a clutch member having a beveled peripheral face and secured on the said shaft, a transmission-wheel mounted to rotate loosely and to slide lengthwise on the said shaft, the inner side of the rim of the wheel being beveled, for engaging the beveled peripheral face of the said clutch member, a spring for holding the clutch member and wheel in frictional contact, and a shaft mounted to rock above the wheel and provided with a handle and an arm carrying at its free end a friction-roller for engagement with the side of the wheel, to slide the latter lengthwise on the shaft against the tension of the spring and to move the wheel out of frictional contact with the clutch member, as set forth.

In testimony whereof I have signed my name to this specification in the presence of two subscribing witnesses.

MAURICE PIVERT.

Witnesses:
ALEX. ESTEIN,
GEORGE KELLER.